Nov. 6, 1962    A. N. O'DAY    3,062,188
WASHING APPARATUS
Filed Sept. 19, 1960    2 Sheets-Sheet 1

INVENTOR.
ALBERT NED O'DAY
BY Shanley & O'Neil
ATTORNEYS

Nov. 6, 1962 A. N. O'DAY 3,062,188
WASHING APPARATUS
Filed Sept. 19, 1960 2 Sheets-Sheet 2

INVENTOR
ALBERT NED O'DAY
BY Shanley & O'Neil
ATTORNEYS

United States Patent Office 3,062,188
Patented Nov. 6, 1962

3,062,188
WASHING APPARATUS
Albert Ned O'Day, 38 Vine St., Woonsocket, R.I.
Filed Sept. 19, 1960, Ser. No. 57,023
6 Claims. (Cl. 119—159)

This invention relates to washing and cleaning devices and more particularly to apparatus for washing domestic animals.

The novel apparatus provided by the present invention makes it possible to effect, with relative ease and minimum inconvenience, hygienic care, that is, washing, delousing, etc., of domestic animals, such as dogs, without requiring veterinary services. The apparatus may take the form of a relatively simple construction which may be manufactured at low cost and thus made available to the average owner of domestic animals. In its more sophisticated form, the apparatus includes structure for feeding, under control of the operator, fluid such as water, at a determined temperature, alone or with certain additives to effect cleaning and/or medication of the animal, which structure is characterized so that the apparatus may be time-operated by a coin controlled device.

In general, the cleaning apparatus according to the present invention includes an elongated receptacle having upstanding sidewalls between which the animal is adapted to be placed, with the sidewalls carrying spray means, fed with fluid, for directing the fluid in the form of a spray onto the animal. The invention includes the feature of adjusting the height of the spray means for facilitating the cleaning operation and also of adjusting the height of the sidewalls for accommodating animals of different height. These features are accomplished by the provision of a structure including a fixed sidewall and a movable sidewall with an arrangement for joining the movable sidewall at different heights relative to the fixed sidewall and of supporting the spray means on the movable sidewall.

Other objects and features of the present invention will become apparent from the following detailed description considered in connection with the accompanying drawings which disclosed one embodiment of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 1:
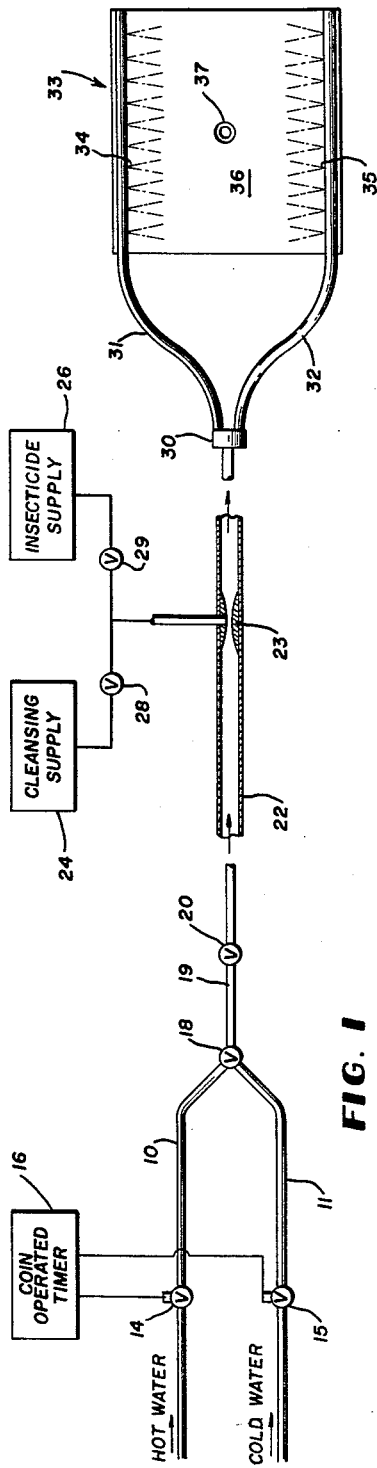
FIGURE 1 is a schematic view of apparatus embodying the invention.

Referring to FIGURE 1, the present invention provides a source of a main fluid including hot water in conduit 10 and cold water in conduit 11, supplied under the control of valves 14 and 15, respectively, which in turn may be time operated by the coin operated timer 16. The hot and cold water is mixed at valve 18 and passes through conduit 19 to a pressure and volume control valve 20. Beyond valve 20 the fluid flows into conduit 22 through venturi 23 at which point a cleansing material from a supply 24 and/or insecticide material from a supply 26 may be added through valves 28 or 29, respectively, the main fluid and any added material are mixed partially at the venturi 23 and more thoroughly at mixing valve 30 from which the fluid mixture travels through flexible conduits 31 and 32 which are connected to the elongated receptacle means 33. As will be described in detail below, the fluid mixture is discharged into the receptacle means 33 through spray means 34 and 35 located within the receptacle means and which extend substantially longitudinally of the receptacle means 33 adjacent both of its sides. The receptacle means 33 includes a floor 36 and a drain 37.

As shown in FIGURES 2 through 5, the receptacle means includes a basin 40 and fixed sidewalls 42 and 43. Adjustable supporting means 44 and 45, associated with the fixed sidewalls 42 and 43, respectively, support movable sidewalls 48 and 49 in contiguous relation with the inside surfaces of fixed sidewalls 42 and 43, respectively, and in heightwise adjustable relation with respective fixed sidewalls. The movable sidewall 48 carries the spray means 34 which comprises an elongated tube secured to the sidewall 48 by brackets 50 and 51, while the movable sidewall 49 carries the spray means 35 which includes an elongated tube secured to the sidewall 49 by brackets 52 and 53. The movable sidewalls 48 and 49 may be raised and lowered individually, or they may be raised and lowered in unison by use of a connector means 55 extending laterally across the receptacle means 33 and joined to the upper edges of the movable sidewalls by securing means 56 and 57. The connector means 55 may also serve as a support for downwardly depending wall 58 which may be used to divide the elongated receptacle means 33 longitudinally into two compartments 60 and 61.

Figure 2:
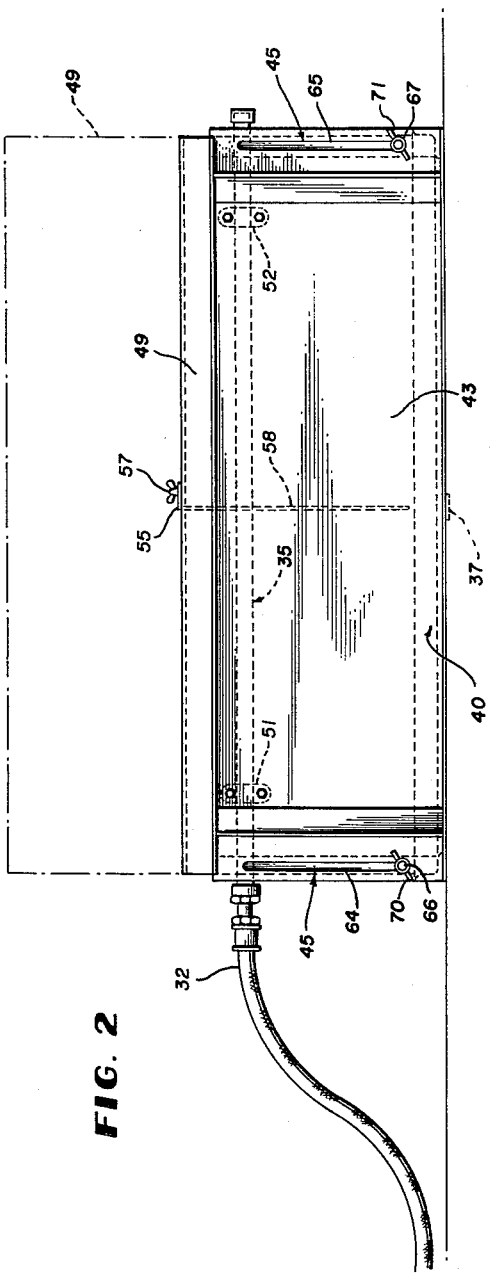
FIGURE 2 is a side view of a portion of the apparatus embodying the invention.
Figure 3:
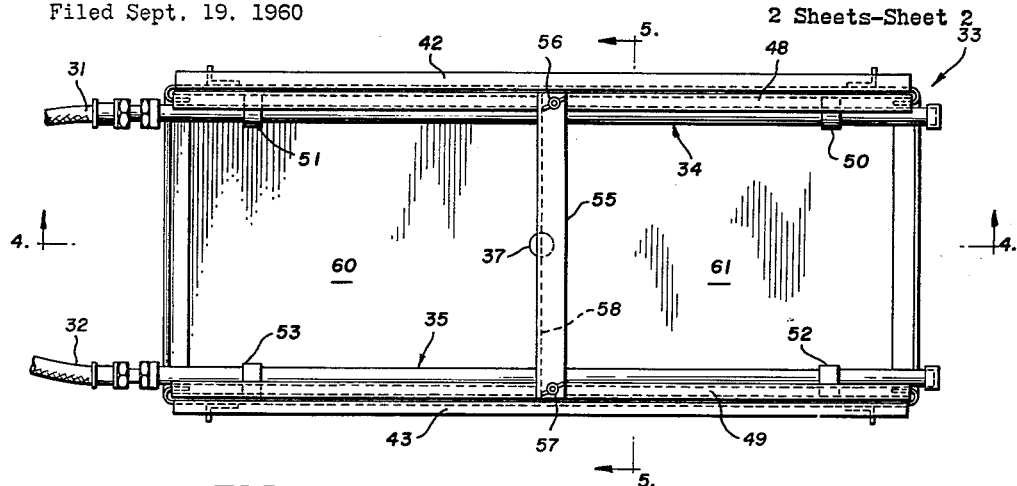
FIGURE 3 is a top plan view of apparatus embodying the invention.
Figure 4:
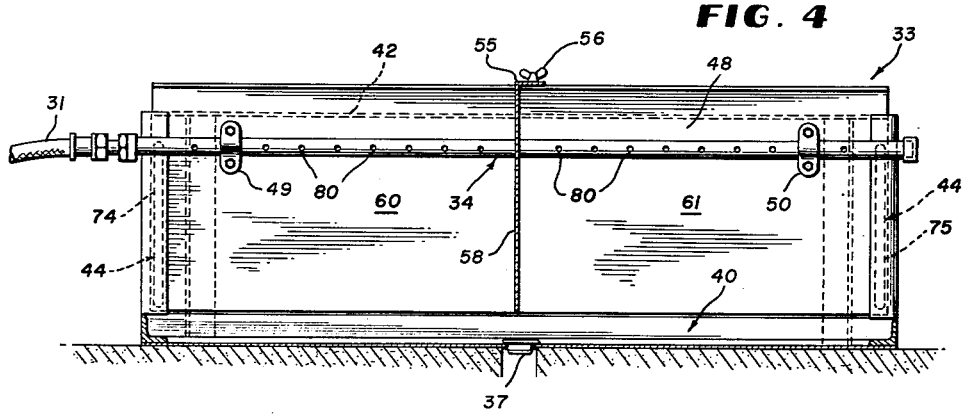
FIGURE 4 is a view, partly in section, taken along the lines 4—4 of FIGURE 3.
Figure 5:
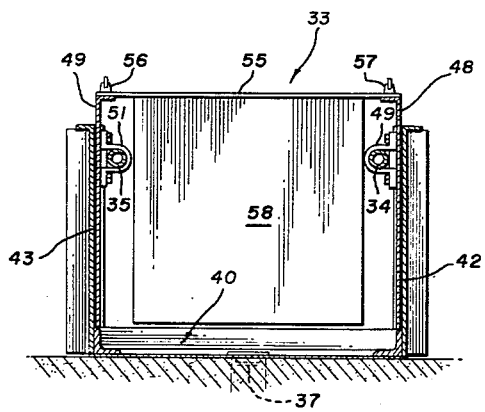
FIGURE 5 is a cross-sectional view taken along the lines 5—5 of FIGURE 3.

Details of the adjustable supporting means 44 and 45 and the manner such means function to support the movable sidewalls 48 and 49 at different heightwise positions relative to the respective fixed sidewalls are disclosed in and will be more fully understood from FIGURES 2 and 4. As shown in FIGURE 2, the fixed sidewall 43 includes means forming vertically disposed locking slots 64 and 65 at its opposite ends. The slots 64 and 65 extend from above the basin 40 and terminate below the upper edge of the fixed sidewall 49 and are adapted to receive pins 66 and 67, respectively. The pins 66 and 67 are secured to opposite ends of the movable sidewall 49 adjacent its lower edge, as viewed in the drawings, and project outwardly from the outside surface of the movable sidewall for passage through the respective slots 64 and 65 and terminate beyond the outside surface of the fixed sidewall 43. The terminating ends of the pins are threaded to receive wing nuts 70 and 71, respectively, which when rotated to locking position overlie a marginal portion of the outside surface of the fixed sidewall adjacent the slots and clamp the movable sidewall to the fixed sidewall at any relative heightwise position along the height of the slots. In FIGURE 2, the adjustable sidewall 49 is shown in its downwardmost or its fully retracted position, while the sidewall 49 depicted by broken lines shows the extended or uppermost position of the movable sidewall 49 in which the movable sidewall is in overlapping relation with the fixed sidewall 43.

The adjustable supporting means 44 operative between the fixed sidewall 42 and the movable sidewall 48 is constructed in a manner similar to the adjustable supporting means 45. As shown in FIGURE 4, the fixed sidewall 42, adjacent its end, is provided with means forming vertically disposed slots 74 and 75 through which pins, not shown, projecting outwardly from the movable sidewall 48, pass and cooperate with wing nuts, not shown, to clamp the movable sidewall 48 onto the fixed sidewall 42 at any desired position throughout the height of the slots.

As mentioned above, the spray means 34 and 35 comprise tubes extending longitudinally of the receptacle and connected at one end to the fluid mixture supply conduits 31 and 32, respectively; the tubes being closed at their other ends. The tubes are provided, substantially throughout their length, with a plurality of longitudinally spaced nozzle means 80 which communicate with the exterior of the tubes and provide discharge openings for the fluid fed thereto. The nozzle means 80 are designed to discharge the fluid inwardly in the form of a spray and are longitudinally spaced from each other so that an animal placed in the receptacle is subject to a continuous spray throughout its length; the discharge path of the nozzle means may be directed downwardly as well as inwardly to facilitate the operation. The nozzle means may be formed in the walls of the tubes or may comprise individual nozzles secured to openings provided in the tubes.

In operation, an animal is placed in the receptacle, longitudinally of and between the fixed sidewalls 42 and 43. The movable sidewalls 48 and 49 are then adjusted heightwise to position the spray means in the proper relationship to the animal so that the fluid spray from the nozzle means 80 is directed onto at least the upper portion of the animal. The water supply is then turned on, such as upon coin operation of the timer 16, and water at the proper temperature is fed to the spray means 34 and 35 and discharged onto the animal. As required, cleaning and insecticide material is added to the water upon operation of valves 28 and 29 which may be activated upon operation of the timer. During the course of the operation, such as during rinsing, movable sidewalls 48 and 49 may be unclamped and moved downwardly and upwardly to positively direct fluid onto all portions of the animal. When relatively small animals are involved, the partition 58 may be employed to provide a plurality of compartments so that a number of animals may be treated at the same time.

There is thus provided by the present invention a novel apparatus for bathing or otherwise treating animals which is operable to feed fluid, such as water, alone or with determined quantities of cleaning material or insecticide material onto and over substantially the total external area of the animal. The apparatus includes a novel adjustable feature which makes it possible to accommodate animals of different height with the animal at all times during the operation being within the confines of the apparatus and thus substantially prevents undesirable splashing of fluid onto the operator. The adjustable feature also makes it possible to vary the direction of application of the fluid, discharged as a spray, onto the animal and thereby obtain a quicker and more complete cleaning and rinsing operation. Also, the apparatus provided by the present invention is capable of coin operation.

Although only one embodiment of the present invention has been described and disclosed herein, it is to be expressly understood that various changes and substitutions may be made therein without departing from the spirit of the invention as well understood by those skilled in the art. Reference therefore will be had to the appended claims for a definition of the limits of the invention.

What is claimed is:

1. Apparatus for spraying liquids used in the hygienic care of domestic animals such as dogs, cats, etc. comprising an elongated basin, upstanding fixed walls extending along the sides of the basin, a movable upstanding wall supported in overlapping relation by each of the fixed walls for relative heightwise movement, elongated liquid spraying means secured to each movable upstanding wall, and means for releasably joining the fixed and movable walls to adjust the height of the spraying means above the basin.

2. Apparatus for spraying liquids used in the hygienic care of domestic animals such as dogs, cats, etc. comprising an elongated basin, upstanding fixed walls extending along the sides of the basin, a movable upstanding wall supported in overlapping relation by each of the fixed walls for relative heightwise movement, elongated liquid spraying means secured to each movable upstanding wall, the liquid spraying means being substantially coextensive longitudinally with the basin, means for releasably joining the fixed and movable walls to adjust the height of the spraying means above the basin.

3. An animal shower-bath comprising an elongated receptacle means having fixed sidewalls, heightwise adjustable sidewalls substantially coextensive longitudinally with the receptacle means and in heightwise overlapping relationship with the fixed sidewalls, fluid spray means secured to the heightwise adjustable sidewalls, and fluid supply means connected to the spray means.

4. An animal shower-bath comprising an elongated receptacle means including a floor and fixed sidewalls extending vertically above the floor, movable sidewalls substantially coextensive longitudinally with the receptacle means, means adjustably mounting the movable sidewalls on the fixed sidewalls in heightwise adjustable overlapping relationship with the fixed sidewalls, elongated fluid spray means secured to and substantially coextensive longitudinally with the movable sidewalls, and fluid supply means connected to the spray means.

5. An animal shower-bath as defined in claim 4 in which the fluid supply means includes means for adding hygienic materials to the fluid supply means.

6. An animal shower-bath comprising an elongated receptacle means including a floor and fixed sidewalls, heightwise adjustable sidewalls mounted on the fixed sidewalls in overlapping relationship therewith, connector means secured to each heightwise adjustable sidewall and extending laterally across the receptacle means to permit heightwise movement of the sidewalls in unison, spray means secured to the adjustable sidewalls and fluid supply means connected to the spray means including a carrier fluid supply, a hygienic fluid supply, and means for mixably adding the hygienic fluid to the carrier fluid.

References Cited in the file of this patent

UNITED STATES PATENTS

| | | |
|---|---|---|
| 876,631 | Goff | Jan. 14, 1908 |
| 1,760,017 | Smoot | May 27, 1930 |
| 2,499,174 | Turner | Feb. 28, 1950 |